May 9, 1961 W. H. PHELPS 2,983,096
ROTARY CUTTER AND HOUSING STRUCTURE
Filed Oct. 8, 1954 5 Sheets-Sheet 1

Inventor:
William H. Phelps
By: Schroeder, Merriam,
Hofgren & Brady
Attorneys

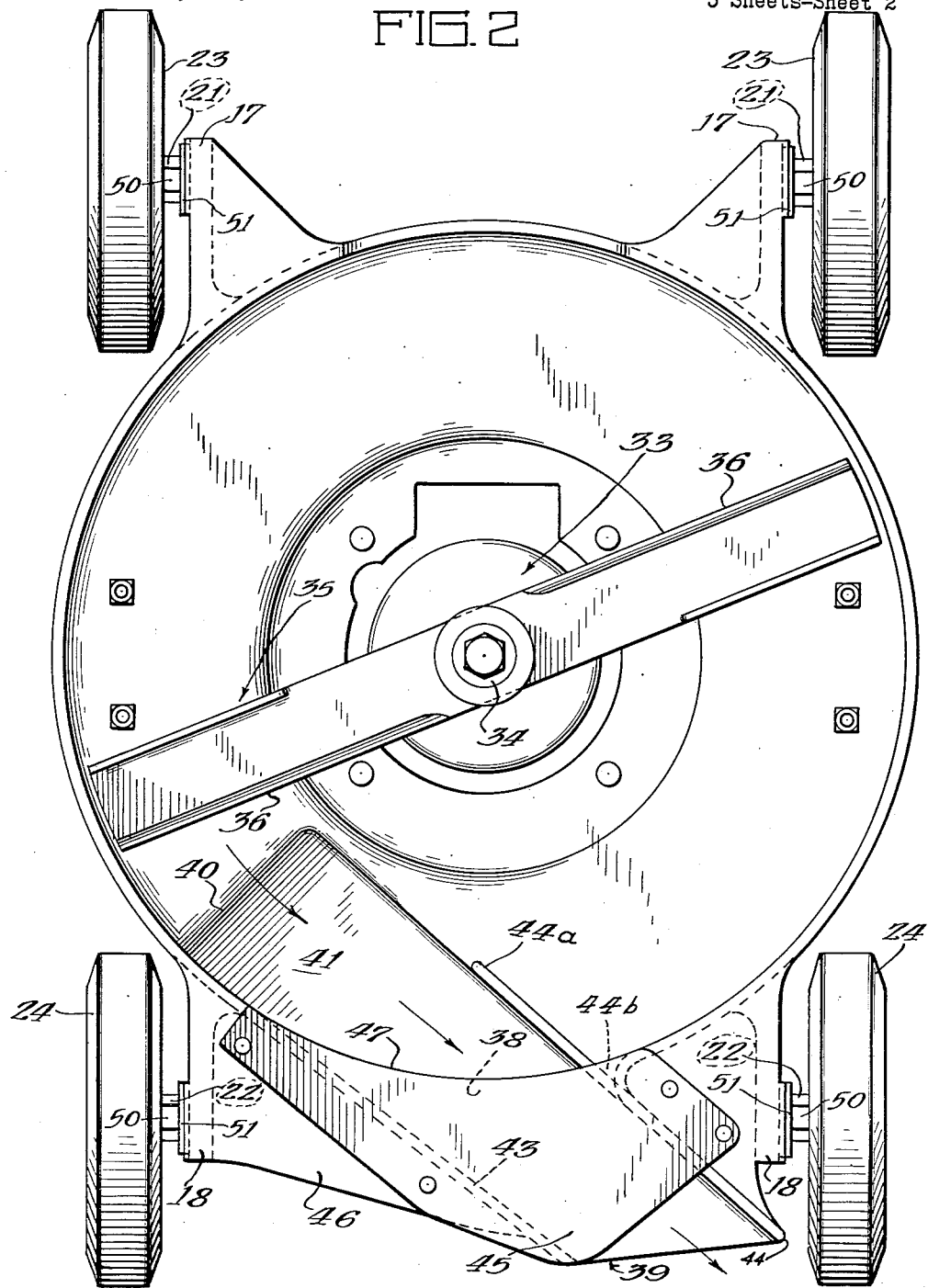

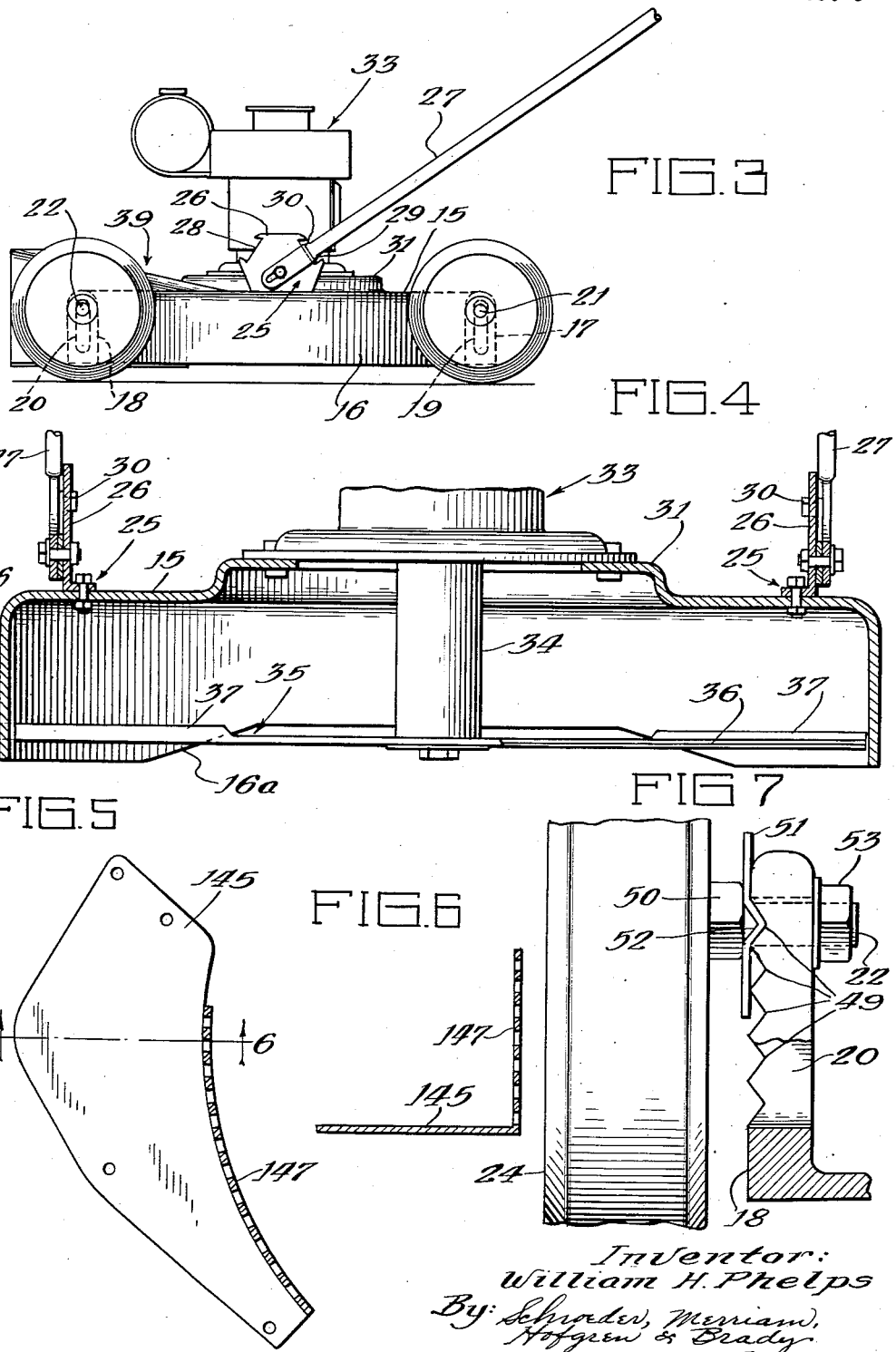

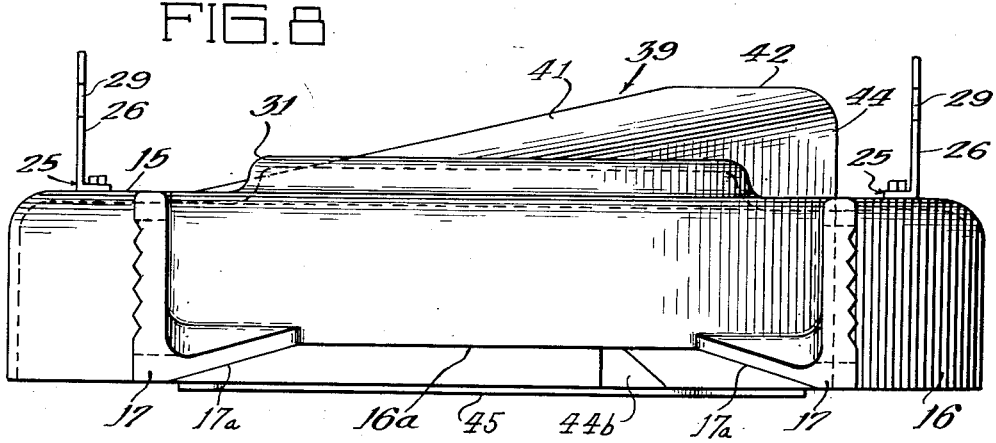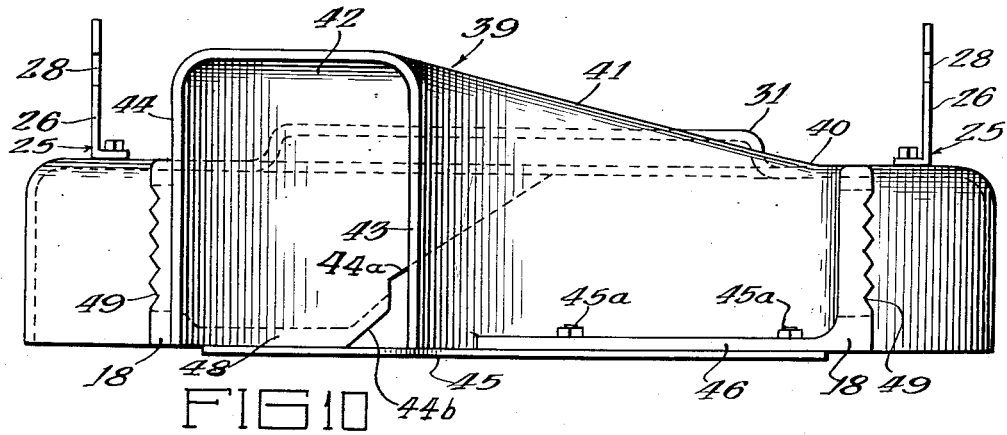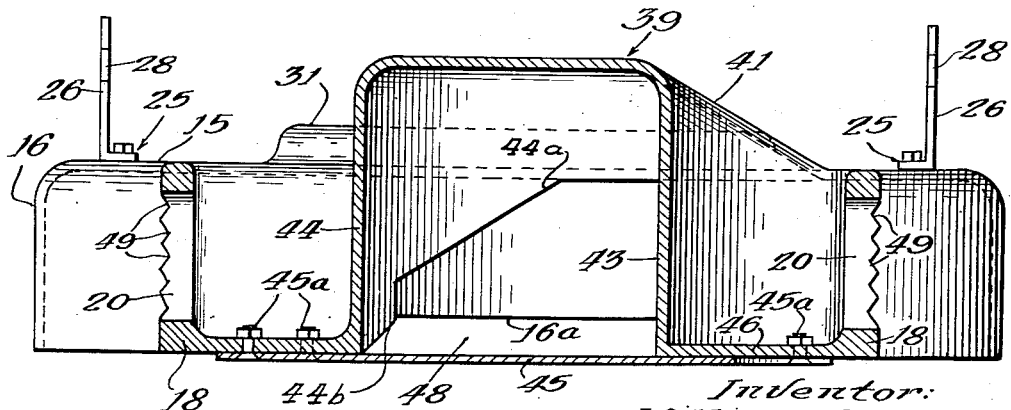

May 9, 1961 W. H. PHELPS 2,983,096
ROTARY CUTTER AND HOUSING STRUCTURE
Filed Oct. 8, 1954 5 Sheets-Sheet 5

Inventor:
William H. Phelps
By: Schroeder, Hofgren,
Brady & Wegner
Attorneys

United States Patent Office 2,983,096
Patented May 9, 1961

2,983,096
ROTARY CUTTER AND HOUSING STRUCTURE

William H. Phelps, % Sensation Mover Inc.
7577 Burlington St., Ralston, Nebr.

Filed Oct. 8, 1954, Ser. No. 461,097

11 Claims. (Cl. 56—255)

This invention relates to an improved power mower having a horizontally rotating blade, in which the frame and blade shape combine to create an ascending air current which draws loose, light material upwardly, circulates it within the frame, and discharges it through a discharge spout laterally of the path of the mower. This application is a continuation-in-part of applicant's copending application Serial No. 375,385, filed August 20, 1953, now abandoned.

Mowers having a horizontally rotating blade do a better job of mulching the grass clippings than a reel type mower because the rapidly rotating blade may cut each clipping into several small pieces.

The principal object of the present invention is to provide such a mower which performs a very smooth cutting job, and in which the mulching action is far superior to that of any machine previously available. This is accomplished by a combination of frame shape and blade shape which create an ascending air current which may lift loose, light material, circulate it within the skirt and discharge it through a discharge hood laterally with respect to the path of the mower. The circular frame and integral depending skirt form a chamber the bottom of which is generally in the plane of the blade.

Another object of the invention is to provide a mower in which the clearance between the tips of the blade and the skirt is extremely small—about 3/16 of an inch on a 20 inch mower, and definitely not in excess of 1/4 inch, or proportionately slightly more on a 24 inch mower. The result of the extremely small blade clearance is that when the mower is operating the blade effectively seals the bottom of the chamber so that there is no spillage or leakage of air between the tips of the blade and the skirt. Thus, air and clippings which are drawn up through the blade can discharge only through the discharge spout which extends diagonally outwardly from the skirt at one end of the frame.

Particularly, a mower in which the cubic volume inside the chamber is 45 to 65 times the swath of the blade, or the diameter of the chamber provides optimum performance by fluffing the clippings, etc., with a sufficient volume of air to effect proper circulation and discharge of material.

A further object is to provide such a mower in which the handle for pushing and guiding the mower may be swung between two inclined positions in which it projects from opposite ends of the mower, so that the mower need not be turned around when its direction of movement is to be reversed so that the clippings might always be discharged to the same side. Thus, the clippings are normally discharged into the uncut grass so that when the mower passes over them again they are again picked up by the air current created by the blade so as to be chopped and re-chopped by the blade to a fine mulch which may be left upon a lawn without damage to the grass.

A further object is to provide a power mower which may be employed for mulching leaves.

A further object is to provide a power mower in which the discharge spout is directed diagonally toward one side and has a closed bottom so as to project clippings a substantial distance laterally of the path of the mower. The use of a discharge spout having a closed bottom, in combination with the chamber having a volume to swath ratio of 55:1 plus or minus 10, and a blade the tips of which are so close to the skirt as to effectively seal the mower chamber, produces a definite air pressure through the discharge spout so that substantially 100% of the clippings are retained in the circulating air stream within the chamber and blown forcibly through the discharge spout. The small blade tip clearance, in combination with the closed bottom on the spout, prevents clippings from dropping out the bottom of the mower instead of being discharged through the spout.

Yet another object is to provide a mower having very simple means for adjusting the frame with respect to the wheels so as to permit the blade to operate at varying heights above the ground.

The invention is illustrated in the accompanying drawings in which:

Fig. 2 is a bottom plan view of the mower;

Fig. 3 is a side elevational view of the mower drawn to a reduced scale;

Fig. 4 is a section taken as indicated along the line 4—4 of Fig. 1 with the motor and blade mounted on the mower cowling;

Fig. 5 is a top plan view of a leaf mulching attachment for said mower;

Fig. 6 is a section taken as indicated along the line 6—6 of Fig. 5;

Fig. 7 is an enlarged fragmentary elevational view, partially in section, showing the adjustable wheel mounting;

Fig. 8 is an end elevational view of the mower with the motor and wheels removed, viewed from the end opposite the discharge spout;

Fig. 9 is a view similar to Fig. 8 taken from the discharge spout end of the unit;

Fig. 10 is an enlarged sectional view taken along the line 10—10 of Fig. 1 with the wheels removed;

Figure 1:
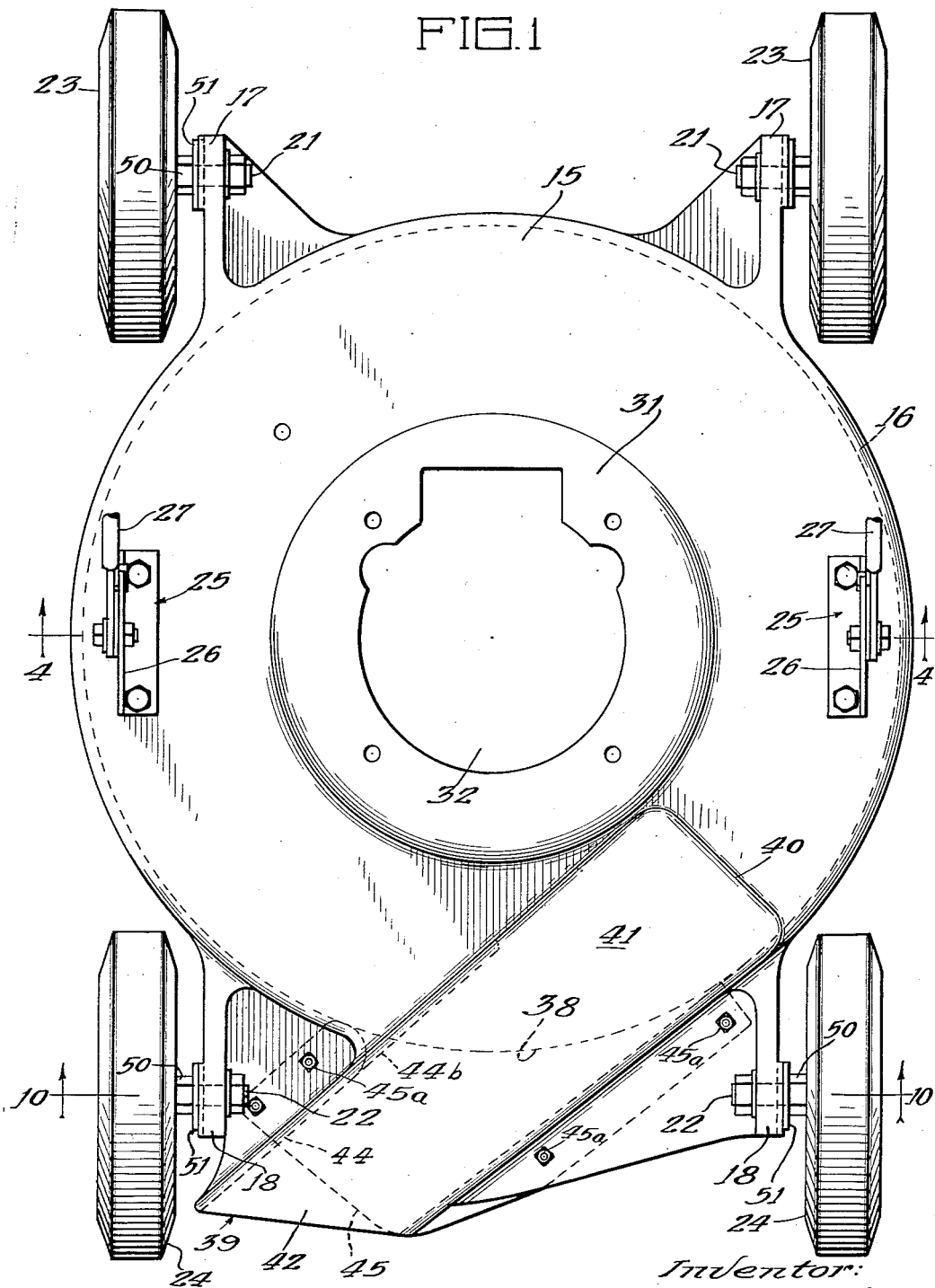
Fig. 1 is a top plan view of a mower constructed in accordance with the present invention with the motor removed and the handle broken away.

Referring to the drawings in greater detail, and referring first to Figs. 1 and 3, a power mower has a plate-like circular horizontal frame which forms a cowling 15 provided with a substantially vertical peripheral depending skirt 16 which has at one end a transverse recess 16a. The frame 15 and skirt 16 provide an open-bottom mulching chamber. At opposite ends of the frame are integral wheel mounting arms 17 and 18 having slots 19 and 20, respectively, to slidably receive stub axles 21 and 22 for pairs of wheels 23 and 24. Referring to Fig. 1 it will be noted that the span across either of the pairs of wheels 23 or 24 is less than the diameter of the skirt 16 so that the skirt extends beyond the wheels on both sides.

Mounted on top of the plate-like frame 15 are angle members 25 the upright portions of which form brackets 26 having notches 28 and 29, one or the other of which may be engaged by lugs 30 on a handle 27. Thus, the handle may be inclined toward either end of the machine, and the machine may be pushed in either direction. The handle mounting is described in detail and claimed in my copending application Serial No. 325,606, filed December 12, 1952, issued September 18, 1956, as Patent 2,763,492.

At the center of the plate-like frame 15 is an upwardly extending boss 31 having a central opening 32, and a gasoline motor, indicated generally at 33, is mounted on the boss with a shaft 34 extending downwardly through the frame 15. At the lower end of the shaft 34 is a cutter blade, indicated generally at 35.

The blade 35 is adapted to rotate counter-clockwise as viewed in Fig. 2, or clockwise with respect to Fig. 1, and has beveled, sharpened cutting edges 36 along the leading edges of its two end portions. As best seen in Fig. 4, the blade has an upturned flange portion 37 at each end along the trailing edge to produce an ascending air current when the blade rotates which may lift loose, light material and circulate it within the skirt 16.

The open-bottom chamber defined by the frame 15 and skirt 16 has a cubic volume which is 45 to 65 times as great as the length of the blade or "swath" of the mower; producing a "volume to swath" ratio of 55:1, plus or minus 10.

Figure 11:
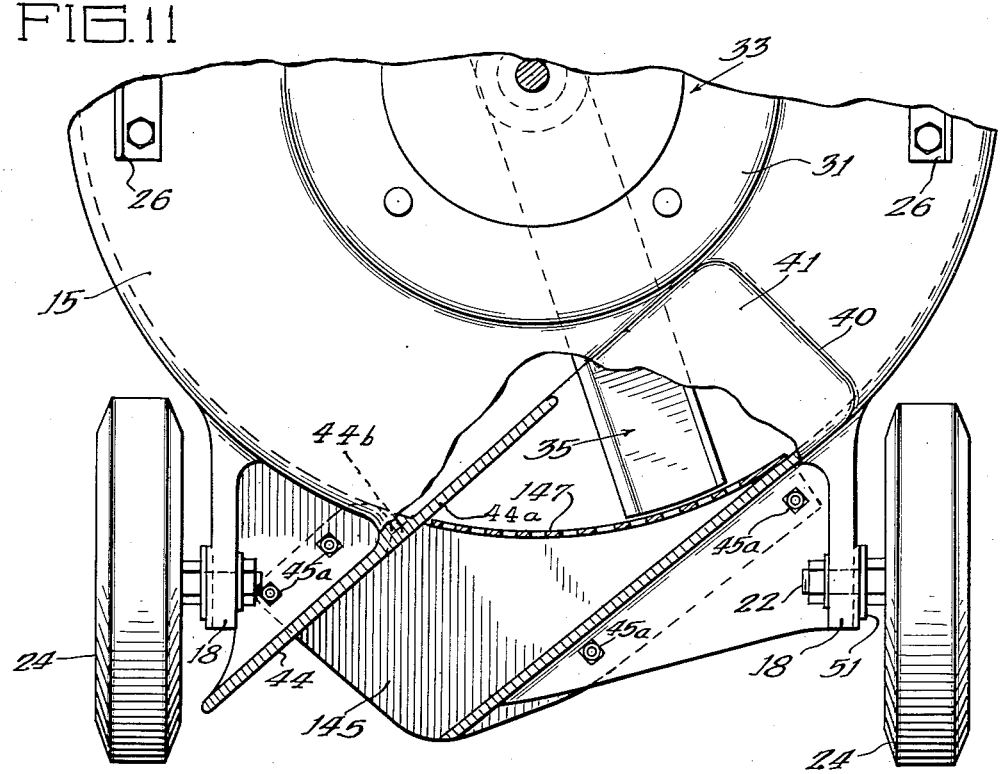
Fig. 11 is a fragmentary top plan view, partially in section, with the leaf mulcher attachment in place.

As seen in Figs. 2, 4 and 11, the clearance between each tip of the blade 35 and the skirt 16 is very small. This clearance is preferably 3/16 of an inch or less on a 20 inch mower, and must not exceed 1/4 inch. A 3/8 inch clearance is definitely too large on a 20 inch mower, and permits excessive leakage or spillage of air and clippings between the tips of the rotating blade and the skirt which forms the wall of the mulching chamber. The 1/4 inch maximum clearance on a 20 inch blade produces a clearance to blade ratio of 1:80, or 1.25%. The clearance on a larger mower, such as 24 inch, may be correspondingly larger but should never exceed 1.25% of the blade length. The very small clearance at the blade tips effectively seals the margin of the chamber when the blade rotates to draw air into the chamber, so that little air spillage takes place around the blade tips.

As best seen in Figs. 2, 9 and 10, the skirt 16 has an opening 38 between the pair of wheels 24 at the end of the machine opposite the recess 16a, and a discharge spout, or hood, indicated generally at 39, extends horizontally outwardly from said opening 38 in the skirt. The spout 39 is formed integrally with the plate-like frame 15, and its inner margin 40 lies along a radius of the frame with the top wall 41 of the spout inclined upwardly from the frame 15 toward the open outer end 42 of the spout. The inclined top wall 41 of the spout has its inner margin 40 spaced a considerable distance from the opening 38 in the skirt, so that at the line of the skirt the height of the passage formed by the spout, which is designated by the numeral 48, is somewhat greater than the height of the skirt 16. The outer wall 43 of the spout forms a tangential projection of the circular skirt 16 which extends laterally and longitudinally beyond the frame 15, between the wheels 24, and the inner side wall 44 of the spout, which is parallel to the outer side wall 43, extends outwardly along a plane which is a projection of a chord of the circle formed by the skirt 16. The juncture of wall 44 and skirt 16 is bevelled, as seen at 44b, and forms an inclined triangular area. The wall 44 terminates at the skirt 16 but for a strengthening brace 44a which has an inclined lower margin extending from near the base of skirt 16 upwardly and inwardly to form a triangular baffle which terminates substantially in line with the junction of wheel brackets 18 and skirt 16 (see Figs. 2, 9, and 10). In heavy grass this inclined baffle tends to slide long cuttings downwardly toward the blade where they may be chopped off and thrown into the discharge spout.

The recess 16a between the wheel mounting arms 17 provides an air intake, so that a large proportion of the air drawn into the cowling enters at the end opposite the discharge spout. This provides a sort of "air combing" action which straightens the grass so it may be sheared cleanly by the blade when the machine is operated with the discharge spout at the rear, and helps reduce air turbulence below the blade. The front wheel mounting arms 17 have inclined bottom surfaces 17a which merge into recess 16a, so that the span over which air is drawn into the recess occupies about 2/3 of the cowling width.

In order to keep clippings in the air blast as they pass through the spout 39, a bottom plate 45 is fastened by means of bolts 45a to the underside of a web 46 which extends between the wheel mounting brackets 18, the plate 45 having an arcuate inner margin 47 which conforms to the curvature of the skirt 16. Thus, as best seen in Fig. 9, the plate 45, in cooperation with the side walls 43 and 44 and the top wall 41 of the discharge spout 39 forms the passage 48, previously referred to, which is closed at its top, bottom and sides.

Figure 12:
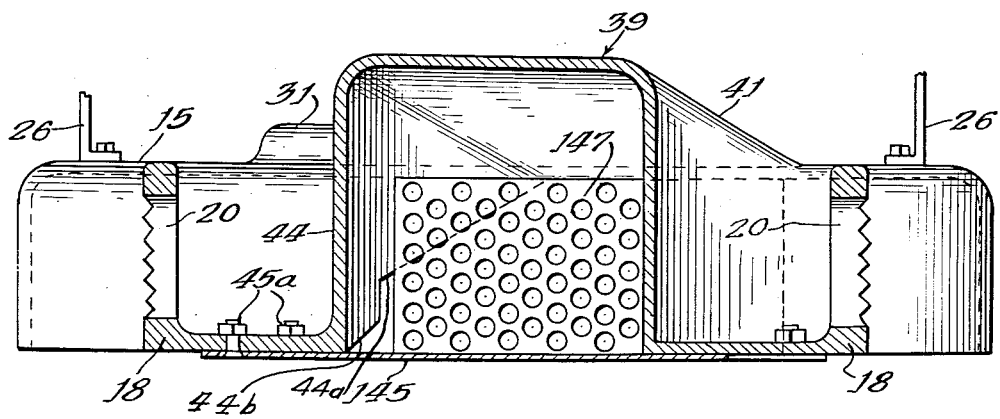
Fig. 12 is a view similar to Fig. 10 with the leaf mulcher in place.

Referring now to Figs. 5, 6 and 12, in order to permit the device to function as a leaf mulcher, an alternative bottom plate 145 may be provided which has an integral upright foraminous baffle 147 which is curved to form a segment of the depending skirt 16, so that it extends across the opening 38 in the skirt. The plate 45 may be readily removed by removing the bolts 45a and may be replaced by the plate 145 which is mounted with the foraminous baffle 147 extending across the opening 38 in the skirt 16. As seen in Fig. 12, the foraminous baffle 147 is the same height as the skirt 16, but as previously pointed out the mouth of the passage 48 formed by the spout is higher than the skirt 16 because of the inclination of the top wall 41 of the spout. Thus, there is an open space between the top of the baffle and the top of the spout. When there is a mass of dead leaves on the ground, they are drawn up into the air current created by the blades 35 and pulverized by the blade action as well as by the operation of the air blast which tends to force them through the openings in the foraminous baffle 147. The clearance between the top of the foraminous baffle 147 and the top of the spout is quite important to the proper functioning of the leaf mulcher, as it permits a substantial air discharge over the top of the baffle which carries with it a large amount of finely powdered leaf mulch. A baffle which closes the entire spout passage 48 is not as efficient as a baffle such as that here disclosed, which has its upper margin spaced from the top of the spout. In this way dead leaves may be mulched or ground to a powder of sufficient fineness that they may be left in the grass without damage, and will disintegrate rapidly into a fine plant food.

In order to permit the height of the blade 35 to be readily adjusted with respect to the ground, the axles 21 and 22 are vertically adjustable in the slots 19 and 20 of the wheel brackets 17 and 18, the mounting being shown in detail in Fig. 7 with reference to the left wheel 24. The outer face of the bracket 18 flanking the slot 20 is provided with a plurality of notches 49. The stub axle 22 for the wheel 24 has an inner hex nut 50 against which is mounted a washer-like rectangular adjusting plate 51 which has a horizontal detent 52 which is complementary to any one of the notches 49. The stub axle 22 may be adjustably mounted in the slot 20 by positioning the detent 52 in the adjusting plate 51 in any desired notch 49 and tightening up the retaining hex nut 53 which tends to compress the adjusting plate 51 between the bracket 18 and the outer nut 50 so as to force the detent 52 into firm frictional engagement with the selected notch 49. Each of the brackets 17 and 18, and each of the stub axles 21 and 22 is similarly constructed so that the four wheels may be located in any desired adjusted position within its mounting slot.

The operation of the present mower is quite different from any other with which applicant is familiar. The deep mulching chamber formed by the circular frame 15 and substantially vertical depending skirt 16 provides a large volume of air above the blade 35, and affords a substantial pressure through the discharge spout. As previously pointed out, the ratio between the volume of the chamber and the swath of the blade or diameter of the chamber should be 55:1 plus or minus 10 in order to obtain smooth positive discharge of clippings through the spout. The large volume of air in the chamber acts in much the same manner as the air dome in a force pump, serving as an air cushion which provides even and continuous discharge pressure through the spout.

Experimental work in connection with the development of the present device included a number of different constructions in an attempt to obtain steady discharge without clogging of grass in the spout, particularly grass which is wet. With a smaller volume to swath ratio performance decreased steadily to a point where there was almost a complete lack of discharge of clippings through the spout. An increase in the volume to swath ratio caused a reduction of pressure and a consequent lowering of the air velocity through the spout. With the stated volume to swath ratio, a machine will mow and discharge grass clippings which are very wet—wetter than it is ordinarily practical to mow—and there is no sticking in the discharge spout nor building up of grass clippings within the chamber. If the depth of the mulching chamber is reduced only one inch the machine will clog quite readily when mowing grass which is only moderately wet; and a two inch reduction in depth of the chamber results in ragged mowing and considerable power loss.

The machine of the present invention mows more efficiently because all the clippings are drawn up into the mulching chamber and discharged through the spout, so that there is no interference with blade action. The machine acts almost as a vacuum cleaner, leaving almost no clippings in any area over which it has passed. When the clippings are continually falling through the path of the blade they tend to cushion the blade and reduce its cutting efficiency.

The foregoing detailed description is given for clearness of understanding only and no unnecessary limitations are to be understood therefrom, as some modifications will be obvious to those skilled in the art.

I claim:

1. In a mobile mower: a rotating blade adapted to produce a substantial updraft, a cowling having a peripheral depending skirt, said skirt having a bottom edge in a plane slightly below that of said blade and concentric therewith, said cowling having an outwardly extending spout, said spout, exteriorly of said cowling, having inner and outer sidewalls, a top, and a bottom which is substantially coplanar with the bottom of said skirt, the outer wall of said spout forming a tangential projection of said skirt and said inner side wall extending outwardly from said skirt and inwardly and upwardly therefrom to an intermediate point on said cowling, and the underside of said cowling being otherwise unobstructed, whereby grass cut by said blade will be mulched and gradually discharged through said spout.

2. In a mobile mower: a rotating blade adapted to produce a substantial updraft, a cowling having a peripheral depending skirt, said skirt having a bottom edge in a plane slightly below that of said blade and concentric therewith, the ratio of the volume of said cowling to its inside diameter in the plane of the blade being 55 to 1 plus or minus 10, said cowling having an outwardly extending spout, said spout, exteriorly of said cowling, having inner and outer sidewalls, a top, and a bottom which is substantially coplanar with the bottom of said skirt, the outer wall of said spout forming a tangential projection of said skirt and said inner side wall extending outwardly from said skirt and inwardly and upwardly therefrom to an intermediate point on said cowling, and the underside of said cowling being otherwise unobstructed, whereby grass cut by said blade will be mulched and gradually discharged through said spout.

3. In a mobile mower: a rotating blade adapted to produce a substantial updraft, a cowling having a peripheral depending skirt, said skirt having a bottom edge in a plane slightly below that of said blade and concentric therewith, the space between each tip of the mower blade and the skirt being no more than 1.25% of the length of the blade, said cowling having an outwardly extending spout, said spout, exteriorly of said cowling, having inner and outer sidewalls, a top, and a bottom which is substantially coplanar with the bottom of said skirt, the outer wall of said spout forming a tangential projection of said skirt and said inner sidewall extending outwardly from said skirt and inwardly and upwardly therefrom to an intermediate point on said cowling, and the underside of said cowling being otherwise unobstructed, whereby grass cut by said blade will be mulched and gradually discharged through said spout.

4. In a mobile mower: a rotating blade adapted to produce a substantial updraft, a cowling having a peripheral depending skirt, said skirt having a bottom edge in a plane slightly below that of said blade and concentric therewith, the ratio of the volume of said cowling to its inside diameter in the plane of the blade being 55 to 1 plus or minus 10, the space between each tip of the mower blade and the skirt being no more than 1.25% of the length of the blade, said cowling having an outwardly extending spout, said spout, exteriorly of said cowling, having inner and outer sidewalls, a top, and a bottom which is substantially coplanar with the bottom of said skirt, the outer wall of said spout forming a tangential projection of said skirt and said inner sidewall extending outwardly from said skirt and inwardly and upwardly therefrom to an intermediate point on said cowling, and the underside of said cowling being otherwise unobstructed, whereby grass cut by said blade will be mulched and gradually discharged through said spout.

5. In a mobile mower: a rotating blade adapted to produce a substantial updraft, a cowling having a peripheral depending skirt, said skirt having a bottom edge in a plane slightly below that of said blade and concentric therewith, said cowling having an outwardly extending spout, said spout, exteriorly of said cowling, having inner and outer sidewalls, a top, and a bottom which is substantially coplanar with the bottom of said skirt, the outer wall of said spout forming a tangential projection of said skirt and said inner side wall extending outwardly from said skirt, and a removable, foraminous baffle of less height than the spout extending upwardly from the bottom of the spout, whereby leaves drawn into the cowling by the rotation of said blade will be mulched and gradually discharged through and over said baffle.

6. In a mobile mower: a rotating blade adapted to produce a substantial updraft, a cowling having a peripheral depending skirt, said skirt having a bottom edge in a plane slightly below that of said blade and concentric therewith, said cowling having an outwardly extending spout, said spout, exteriorly of said cowling, having inner and outer sidewalls, a top and a removable bottom which is substantially coplanar with the bottom of said skirt, the outer wall of said spout forming a tangential projection of said skirt and said inner sidewall extending outwardly from said skirt, said removable bottom having an arcuate inner edge which is a projection of the line of the skirt and having at said inner edge an upright, foraminous baffle of the same height as the skirt, the upper edge of said baffle being spaced below the top of the spout, whereby leaves drawn into the cowling by the rotation of said blade will be mulched and gradually discharged through and over said baffle.

7. In a mobile mower having front and rear wheels: a rotating blade adapted to produce a substantial updraft, a cowling having a peripheral depending skirt, said skirt having a bottom edge in a plane slightly below that of said blade and concentric therewith, said skirt having a shallow marginal recess between the front wheels of the mower, said cowling having a diagonally outwardly extending spout between the rear wheels of the mower, said spout, exteriorly of said cowling, having inner and outer sidewalls, a top, and a bottom which is substantially coplanar with the bottom of said skirt, the outer wall of said spout forming a tangential projection of said skirt and said inner sidewall extending outwardly from said skirt and inwardly and upwardly therefrom to an intermediate point on said cowling, and the underside of said cowling being otherwise unobstructed, whereby grass cut by said blade will be mulched and gradually discharged through said spout.

8. In a mobile mower having front and rear wheels: a rotating blade adapted to produce a substantial updraft, a cowling having a peripheral depending skirt, said skirt having a bottom edge in a plane slightly below that of said blade and concentric therewith, said skirt having a shallow marginal recess between the front wheels of the mower, said cowling having a diagonally outwardly extending spout between the rear wheels of the mower, said spout, exteriorly of said cowling, having inner and outer sidewalls, a top, and a bottom which is substantially coplanar with the bottom of said skirt, the outer wall of said spout forming a tangential projection of said skirt and said inner side wall extending outwardly from said skirt, whereby grass cut by said blade will be mulched and gradually discharged through said spout.

9. In a moble mower: a rotating blade adapted to produce a substantial updraft, a generally flat topped cowling having a depending annular skirt, said skirt having a bottom edge in a plane slightly below that of said blade and concentric therewith, said skirt having a shallow marginal recess which extends across the front of the cowling to afford an air inlet, the ratio of the cubic volume of said cowling above the blade to its diameter in the plane of the blade being 55 to 1 plus or minus 10, and an outwardly extending spout communicating with the interior of said cowling generally opposite said shallow recess, said spout having an outer wall which forms a tangential projection of the skirt and extends diagonally outwardly, whereby grass cut by said blade will be mulched and gradually discharged through said spout.

10. In a mobile mower: a rotating blade adapted to produce a substantial updraft, a generally flat topped cowling having a peripheral depending skirt, said skirt having a bottom edge in a plane slightly below that of said blade and concentric therewith, said skirt having a shallow marginal recess which extends across the front of the cowling to afford an air inlet, the ratio of the cubic volume of said cowling above the blade to its diameter in the plane of the blade being 55 to 1 plus or minus 10, and each tip of the blade being spaced from the skirt by a distance which is no more than 1.25% of the length of the blade, and an outwardly extending spout communicating with the interior of said cowling generally opposite said shallow recess, said spout having an outer wall which forms a tangential projection of the skirt and extends diagonally outwardly, whereby grass cut by said blade will be mulched and discharged through said spout.

11. In a mobile mower: a cowling having a depending annular skirt the bottom edge of which is uniplanar but for a shallow recess which extends across the front of the skirt, the ratio of the cubic volume of said cowling above the blade to its diameter in the plane of the blade being 55 to 1 plus or minus 10, a pair of integral front wheel support arms flanking said recess in the skirt, said arms having planar bottom faces which are inclined inwardly and upwardly and terminate at their inner margins flush with the top of said recess so that said bottom faces form the side portions of said recess, a pair of integral rear wheel support arms aligned with said front wheel arms, a blade on a vertical axis within said cowling and slightly above the uniplanar bottom edge portion of the skirt, the tips of said blade being very close to the skirt, and a diagonally outwardly extending discharge spout between the rear wheel arms, one wall of said spout forming a tangential projection of the skirt.

References Cited in the file of this patent
UNITED STATES PATENTS

| | | |
|---|---|---|
| D. 168,064 | Morris et al. | Oct. 28, 1952 |
| 2,523,640 | Zipf | Sept. 26, 1950 |
| 2,641,100 | Sylvester | June 9, 1953 |
| 2,659,191 | Miller et al. | Nov. 17, 1953 |
| 2,675,661 | Titzer | Apr. 20, 1954 |
| 2,709,882 | Abel | June 7, 1955 |
| 2,719,396 | Morris et al. | Oct. 4, 1955 |
| 2,737,003 | Beers | Mar. 6, 1956 |
| 2,760,327 | Boves | Aug. 28, 1956 |